(12) United States Patent
Zheng et al.

(10) Patent No.: US 8,401,345 B2
(45) Date of Patent: Mar. 19, 2013

(54) OPTICAL MODULATOR WITH THREE-DIMENSIONAL WAVEGUIDE TAPERS

(75) Inventors: Xuezhe Zheng, San Diego, CA (US); John E. Cunningham, San Diego, CA (US); Ashok V. Krishnamoorthy, San Diego, CA (US); Dazeng Feng, El Monte, CA (US); Mehdi Asghari, Pasadena, CA (US)

(73) Assignee: Oracle America, Inc., Redwood Shores, CA (US)

( * ) Notice: Subject to any disclaimer, the term of this patent is extended or adjusted under 35 U.S.C. 154(b) by 329 days.

(21) Appl. No.: 12/816,935

(22) Filed: Jun. 16, 2010

(65) Prior Publication Data

US 2012/0207424 A1 Aug. 16, 2012

(51) Int. Cl.
*G02F 1/035* (2006.01)
(52) U.S. Cl. ............................................. 385/2
(58) Field of Classification Search ................. None
See application file for complete search history.

(56) References Cited

U.S. PATENT DOCUMENTS

| | | | | |
|---|---|---|---|---|
| 5,140,651 | A * | 8/1992 | Soref et al. ........................ | 385/2 |
| 7,174,080 | B2 * | 2/2007 | Walker ............................ | 385/131 |
| 7,184,631 | B2 * | 2/2007 | Mitomi et al. ................... | 385/50 |
| 7,218,809 | B2 * | 5/2007 | Zhou et al. ....................... | 385/28 |
| 7,359,588 | B2 * | 4/2008 | Kang et al. ....................... | 385/14 |
| 2005/0185889 | A1 * | 8/2005 | Xia et al. ......................... | 385/43 |
| 2006/0062521 | A1 * | 3/2006 | Zhou et al. ....................... | 385/43 |
| 2006/0126987 | A1 * | 6/2006 | Kang et al. ....................... | 385/2 |
| 2008/0226224 | A1 * | 9/2008 | Blauvelt et al. .................. | 385/14 |

OTHER PUBLICATIONS

Frish, M. B. et al., "Coupling of sing mode fibers to planar Si waveguides using vertically tapered more converters", pp. 1-12, Confluent Photonics, 2002.
Fidaner, Onur et al., "Ge—SiGe Quantum-Well Waveguide Photodetectors on Silicon for the Near-Infrared", pp. 1631-1633, IEEE Photonics Technology Letters, vol. 19, No. 20, Oct. 15, 2007.
Lui, Jifeng et al., "Ultralow Energy, Integrated GeSi Electroabsorption Modulators on SOI", pp. 10-12, IEEE 2008.
Krishnamoorthy, Ashok V. et al., "Computer systems based on silicon photonic interconnects", IEEE, 2008.
Almeida, Vilson R. et al., "Nanotaper for compact mode conversion", pp. 1302-1304, Optics Letters vol. 28, No. 15, Aug. 1, 2003.

(Continued)

*Primary Examiner* — Sung Pak
(74) *Attorney, Agent, or Firm* — Park, Vaughan, Fleming & Dowler LLP; Steven E. Stupp (57) ABSTRACT

An integrated circuit that includes an optical waveguide defined in a semiconductor layer is described. In this integrated circuit, light is coupled between the optical waveguide and an optical modulator, which is disposed on the optical waveguide, using 3-dimensional (3-D) taper structures that are proximate to the ends of the optical modulator. The cross-sectional areas of these 3-D taper structures transition, over a distance, from that of the optical waveguide (distal from the optical modulator) to that of optical modulator (proximate to the ends of the optical modulator). In this way, a spatial extent of an optical mode in the optical waveguide and a spatial extent of the optical mode in the optical modulator may be approximately matched to reduce the optical loss when the light is coupled to or from the optical modulator.

20 Claims, 5 Drawing Sheets

OTHER PUBLICATIONS

Miller, D.A.B, et al., "Band-Edge Electroabsorption in Quantum Well Structures: The Quantum-Confined Stark Effect", pp. 2173-2176, Physical Review Letters vol. 53, No. 22, Nov. 26, 1984.

Roth, Jonathan et al., "Optical modulator on silicon employing germanium quantum wells", Optics Express, pp. 5851-5859, Apr. 30, 2007, vol. 15, No. 9.

Doylend, J. K. et al., "Design and Simulation of an Intergrated Fiber-to-Chip Coupler for Silicon-on-Insulator Waveguides", pp. 1363-1370, IEEE Journal of Selected Topics in Quantum Electronics, vol. 12, No. 6, Nov./Dec. 2006.

* cited by examiner

┌─────────────────────────────────────────────────────────────┐
│  CONVEY AN OPTICAL SIGNAL USING AN OPTICAL WAVEGUIDE        │
│  DISPOSED ON A SEMICONDUCTOR LAYER IN AN INTEGRATED CIRCUIT │
│                           510                               │
└─────────────────────────────────────────────────────────────┘
                              │
                              ▼
┌─────────────────────────────────────────────────────────────┐
│  APPROXIMATELY MATCH A SPATIAL EXTENT OF AN OPTICAL MODE IN │
│  THE OPTICAL WAVEGUIDE AND A SPATIAL EXTENT OF AN OPTICAL   │
│  MODE IN AN OPTICAL MODULATOR, WHICH IS DISPOSED ON THE     │
│  SEMICONDUCTOR LAYER, USING A 3-D TAPER STRUCTURE TO REDUCE │
│                  OPTICAL-COUPLING LOSS                      │
│                           512                               │
└─────────────────────────────────────────────────────────────┘
                              │
                              ▼
┌─────────────────────────────────────────────────────────────┐
│     OPTICALLY COUPLE THE OPTICAL SIGNAL TO AN OPTICAL       │
│                        MODULATOR                            │
│                           514                               │
└─────────────────────────────────────────────────────────────┘
                              │
                              ▼
┌─────────────────────────────────────────────────────────────┐
│  SELECTIVELY OPTICALLY MODULATE THE OPTICAL SIGNAL IN THE   │
│       OPTICAL MODULATOR BASED ON A MODULATION SIGNAL        │
│                           516                               │
└─────────────────────────────────────────────────────────────┘
```

FIG. 5

OPTICAL MODULATOR WITH THREE-DIMENSIONAL WAVEGUIDE TAPERS

GOVERNMENT LICENSE RIGHTS

The United States Government has a paid-up license in this invention and the right in limited circumstances to require the patent owner to license others on reasonable terms as provided for by the terms of Agreement No. HR0011-08-9-0001 awarded by the Defense Advanced Research Projects Administration.

BACKGROUND

1. Field

The present disclosure generally relates to optical-modulator circuits. More specifically, the present disclosure relates to an optical-modulator circuit that includes three-dimensional waveguide tapers.

2. Related Art

Silicon photonics is a promising new technology that can potentially provide low-power, high-bandwidth and low-latency interconnects in future computing systems. However, in order to implement practical silicon photonic links, efficient light modulators are needed. Note that it is complicated to construct efficient light modulators because the electro-optic effect in silicon (Si) is weak. As a consequence, a number of different types of modulation mechanisms are being investigated. Two promising modulation mechanisms are the electro-absorption associated with the quantum-confined stark effect (QCSE) in SiGe/Ge quantum-well (QW) devices, and the electro-absorption associated with the Franz-Keldysh (FK) effect in tensile-strained germanium (Ge).

QCSE provides a strong electro-absorption mechanism, and has been used to make high-speed, low-power and compact opto-electronic devices using III-V materials. In practice, electro-absorption associated with the QCSE in a multiple QW structure that includes germanium QWs, which are separated by silicon-germanium barriers, can offer a much stronger electro-absorption effect than a depletion-based silicon light modulator. Consequently, silicon-germanium QCSE devices can provide broadband operation with low driver voltage. In addition, the same QCSE device can be used as either a light modulator or a photo detector.

Similarly, increased electro-absorption (relative to silicon) can also be achieved using the FK effect in $Ge_{1-x}Si_x$ (for example, using the enhanced FK effect in tensile strained, epitaxial germanium-on-silicon). Because the FK effect takes place on a sub-pico-second time scale, the speed of the electro-absorption mechanism based on the FK effect is only limited by the RC delay, and can be designed to achieve very high bandwidth. Moreover, the same FK-effect device can also be used as a photo detector with high responsivity and high bandwidth.

However, it is very challenging to integrate these light modulators with silicon-based optical waveguides, which makes it hard to use these light modulators. In particular, it is very challenging to fabricate electro-absorption light modulators with sub-micron on-chip silicon optical waveguides, because epitaxial growth is needed for the active material layers in the electro-absorption light modulators, such as the multilayer QW structures or the tensile-strained germanium layer. (For example, the active materials in an electro-absorption light modulator may be lattice mismatched with silicon by 5%, and may require selective area growth to integrate with silicon optical waveguides.) This epitaxial growth is in a direction normal to the substrate, while the silicon optical waveguides carrying the optical signals are normally in the plane of the substrate. Moreover, it is difficult to couple the light from a sub-micron silicon optical waveguide to the active material layers to modulate the light, and then to couple the modulated light back to a sub-micron output silicon optical waveguide with low optical loss.

Hence, what is needed is an optical-modulator circuit that does not suffer from the above-described problems.

SUMMARY

One embodiment of the present disclosure provides an integrated circuit that includes an optical waveguide defined in a semiconductor layer. In this integrated circuit, an optical modulator, having a first end and a second end, is disposed on the optical waveguide, where a given end, which can be one of the first end and the second end, has a cross-sectional area having a first value. Furthermore, a first 3-dimensional (3-D) taper structure and a second 3-D taper structure are disposed on the optical waveguide. These 3-D taper structures are, respectively, proximate to the first end and the second end, and a height of the first 3-D taper structure and a height of the second 3-D taper structure proximate to the optical modulator approximately equal a height of the optical modulator. In addition, a cross-sectional area of a given 3-D taper structure, which can be one of the first 3-D taper structure and the second 3-D taper structure, increases from a second value distal to the given end to the first value proximate to the given end, thereby reducing optical-coupling loss by approximately matching a spatial extent of an optical mode in the optical waveguide and a spatial extent of an optical mode in the optical modulator.

Note that the semiconductor layer may include silicon. Furthermore, the integrated circuit may include: a substrate; and a buried-oxide layer disposed on the substrate, where the semiconductor layer is disposed on the buried-oxide layer. Additionally, the substrate may include a semiconductor. Consequently, the substrate, the buried-oxide layer and the semiconductor layer may comprise a silicon-on-insulator technology.

In some embodiments, the taper of the given 3-D taper structure is in a plane of the optical waveguide and/or perpendicular to the plane.

Furthermore, the optical modulator may include an electro-optic modulator and/or an electro-absorption modulator.

While the 3-D taper structures may be separate from the optical modulator, in some embodiments the 3-D taper structures are included in the optical modulator.

Another embodiment provides a system that includes the integrated circuit.

Another embodiment provides a method for selectively optically modulating an optical signal in the integrated circuit. During the method, the optical signal is conveyed in the optical waveguide disposed in the semiconductor layer in the integrated circuit. Then, the spatial extent of the optical mode in the optical waveguide and the spatial extent of the optical mode in the optical modulator, which is disposed on the semiconductor layer, are approximately matched using a 3-D taper structure to reduce optical-coupling loss. Note that the 3-D taper structure is disposed on the optical waveguide and is proximate to an end of the optical modulator. In addition, the 3-D taper structure has a height proximate to the optical modulator that approximately equals a height of the optical modulator, and a cross-sectional area of the 3-D taper structure increases from the first value distal to the end to the second value proximate to the end, which approximately equals the cross-sectional area of the optical modulator. Next, the optical signal is optically coupled to the optical modulator. Furthermore, the optical signal in the optical modulator is selectively optically modulated based on a modulation signal.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an integrated circuit, a system that includes the integrated circuit, and a method for selectively optically modulating an optical signal in the integrated circuit are described. This integrated circuit includes an optical waveguide defined in a semiconductor layer. Furthermore, light is coupled between the optical waveguide and an optical modulator, which is disposed on the optical waveguide, using 3-dimensional (3-D) taper structures that are proximate to the ends of the optical modulator. The cross-sectional areas of these 3-D taper structures transition, over a distance, from that of the optical waveguide (distal from the optical modulator) to that of optical modulator (proximate to the ends of the optical modulator). In this way, a spatial extent of an optical mode in the optical waveguide and a spatial extent of an optical mode in the optical modulator may be approximately matched to reduce the optical loss when light is coupled to or from the optical modulator.

By reducing the optical-coupling loss, this optical-coupling technique may solve the problem of integrating an optical modulator with on-chip optical waveguides and, in particular, with on-chip, sub-micron optical waveguides.

Figure 1:
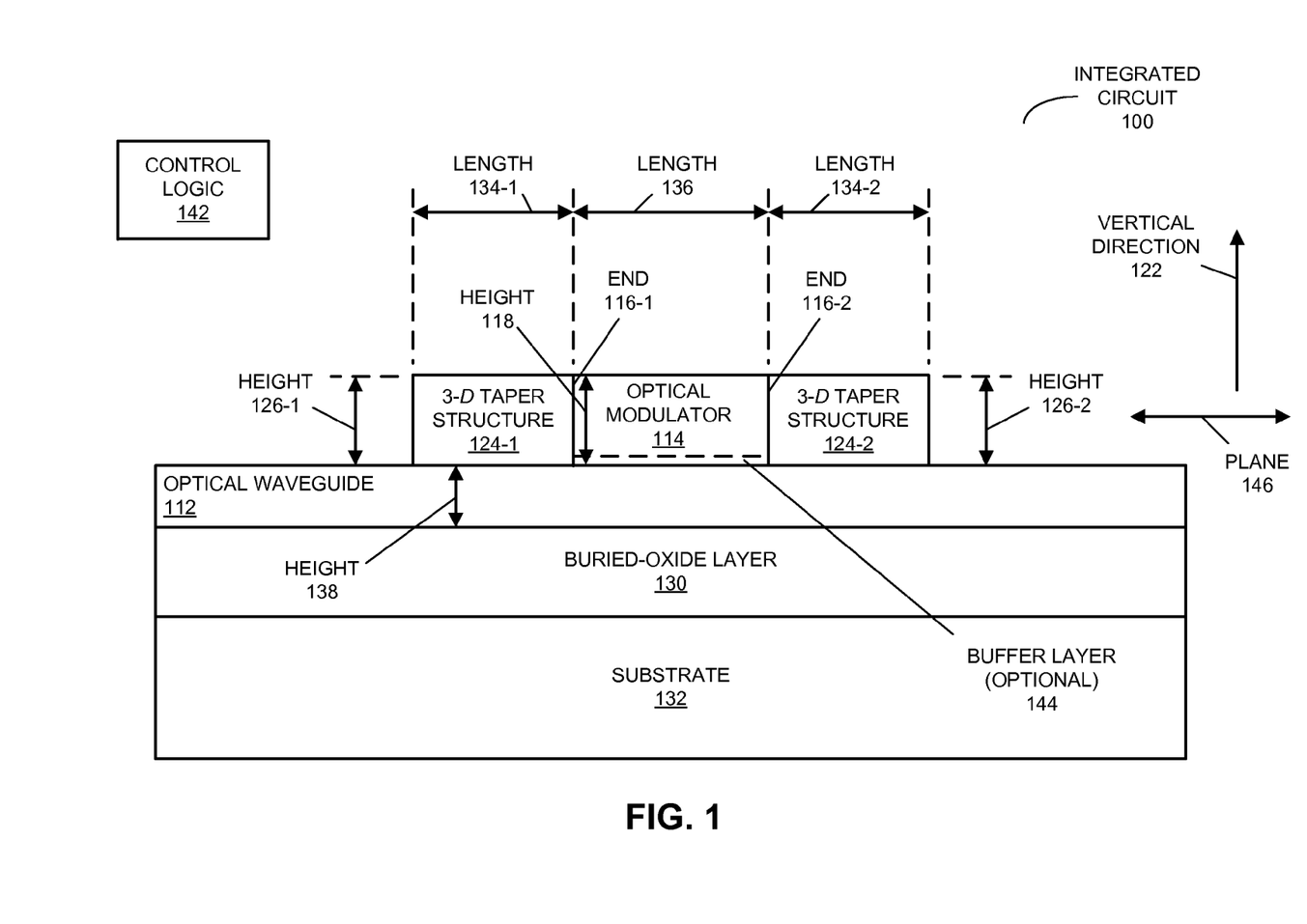
FIG. 1 is a block diagram illustrating a side view of an integrated circuit in accordance with an embodiment of the present disclosure.
Figure 2:
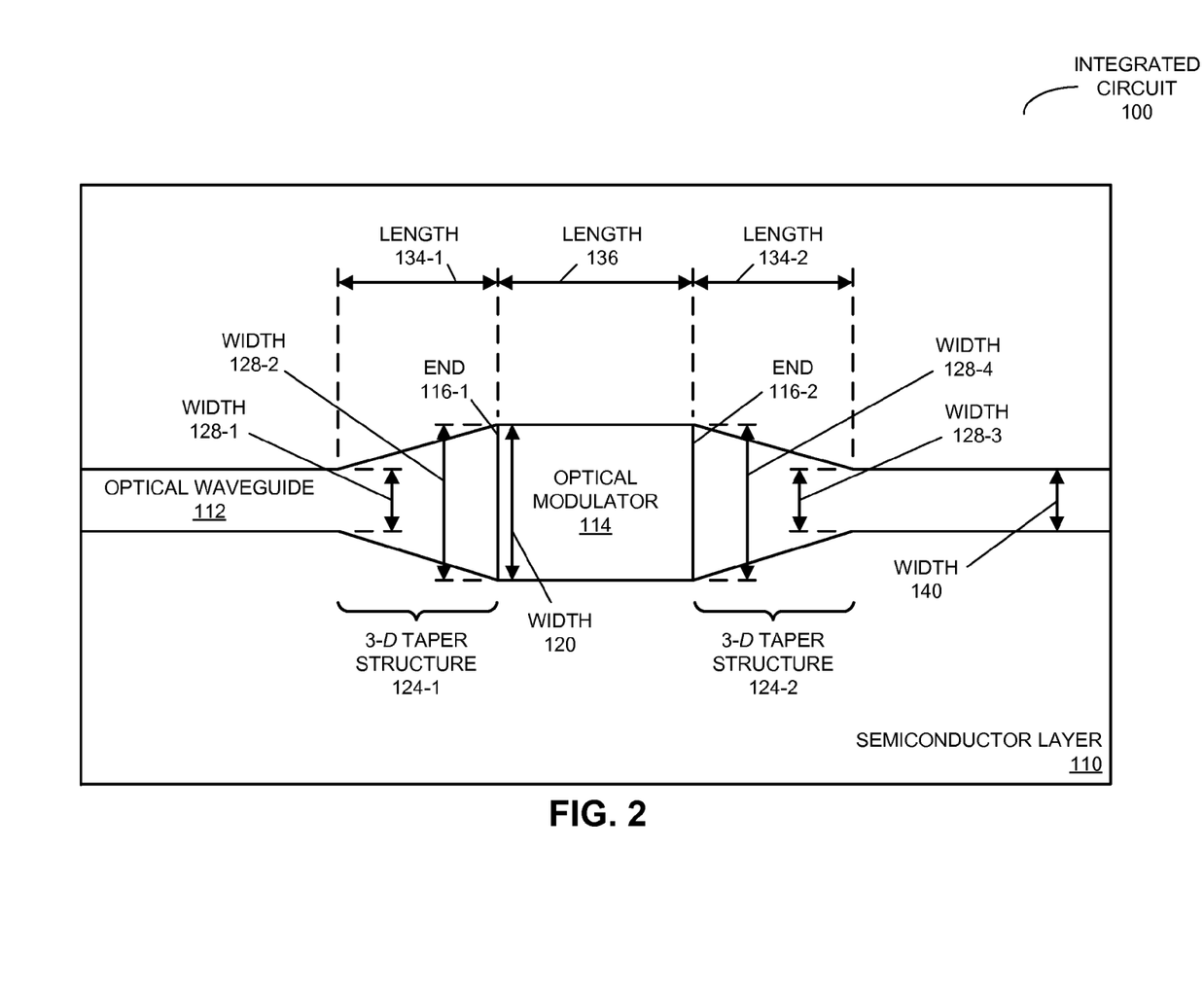
FIG. 2 is a block diagram illustrating a top view of the integrated circuit in FIG. 1 in accordance with an embodiment of the present disclosure.

We now describe embodiments of the integrated circuit. FIG. 1 presents a block diagram illustrating a side view of an integrated circuit 100, and FIG. 2 presents a block diagram illustrating a top view of integrated circuit 100. In this integrated circuit, an optical waveguide 112 is defined in a semiconductor layer 110. Furthermore, an optical modulator 114, having ends 116, is disposed on optical waveguide 112, where a given end, which can be end 116-1 or end 116-2, has a cross-sectional area (associated with height 118 and width 120) having a first value.

Note that in optical modulator 114 light is weakly guided in vertical direction 122, while in optical waveguide 112 it is highly confined because of the big difference between the index of refraction of semiconductor layer 110 and the surrounding material. In other words, the spatial extent of the optical mode in optical waveguide 112 is significantly smaller than the spatial extent of the optical mode in optical modulator 114. As a consequence, significant optical-coupling loss can occur at both of ends 116. For example, if optical waveguide 112 has an optical-mode size of 0.25 µm, and optical modulator 114 has an optical-mode size of 2 µm in vertical direction 122, there will be more than 10 dB optical-coupling loss at each of ends 116. An optical modulator with such a high optical-coupling loss is useless.

Integrated circuit 100 reduces or eliminates the optical-mode mismatch (and, thus, reduces or eliminates the optical-coupling loss) using 3-D taper structures 124 (with index-of-refraction matching to the active material(s) in optical waveguide 112 and optical modulator 114) disposed on optical waveguide 112. These 3-D taper structures are, respectively, proximate to ends 116, and have heights 126 proximate to optical modulator 114 that approximately equal a height 118 of optical modulator 114. In addition, a cross-sectional area (associated with one of heights 126 and one of widths 128) of a given 3-D taper structure, which can be 3-D taper structure 124-1 or 3-D taper structure 124-2, increases from a second value distal to the given end to the first value proximate to the given end. In this way, a spatial extent of an optical mode in optical waveguide 112 can be expanded and shifted upwards so that it approximately matches that in optical modulator 114 to reduce the optical-coupling loss. (Similarly, a spatial extent of an optical mode in optical modulator 114 can be contracted and shifted downward so that it approximately matches that in optical waveguide 112.) In addition, back reflection at ends 116 is reduced by the matching index. Thus, low optical-coupling loss can be achieved when coupling light in and out of optical modulator 114.

While a wide variety of materials can be used in semiconductor layer 110 in integrated circuit 100, in an exemplary embodiment silicon is used. Furthermore, the silicon semiconductor layer may be disposed on a buried-oxide layer 130, which, in turn, is disposed on a substrate 132. Once again, a wide variety of materials may be used in substrate 132, such as a semiconductor, glass or plastic. In an exemplary embodiment, silicon is used in substrate 132, along with silicon dioxide in buried-oxide layer 130. Consequently, in some embodiments, substrate 132, buried-oxide layer 130 and semiconductor layer 110 may comprise a silicon-on-insulator technology.

In some embodiments, optical waveguide 112 conveys an optical signal (i.e., light) having wavelengths between 1.1-1.7 µm, such as an optical signal having a fundamental wavelength of 1.3 or 1.55 µm. The taper of 3-D taper structures 124 may be over a length (such as one of lengths 134) of a region of optical waveguide 112. For example, each of lengths 134 may be between 10 and 200 µm. Furthermore, height 138 of optical waveguide 112 may be between 0.25 and 2 µm, and width 140 of optical waveguide 112 may be between 0.5 and 2 µm. In addition, length 136 of optical modulator 114 may be between 30 and 70 µm, a width 120 of optical modulator 114 may be between 0.5 and 10 µm, and a height 118 of optical modulator 114 may be up to 10 µm. Because optical waveguide 112 and/or optical modulator 114 each may have a quasi-rectangular cross-section, either or both may be quasi-single mode components.

Optical modulator 114 may be turned 'on' or 'off' (i.e., may block or pass the light) based on an applied voltage (and, more generally, based on a modulation signal, such as an electrical signal) that is controlled by control logic 142.

Furthermore, optical modulator 114 may include an electro-optic modulator (i.e., it may modify light polarization) and/or an electro-absorption modulator. For example, optical modulator 114 may include a germanium electro-absorption modulator or a quantum-well (QW) electro-absorption modulator that is based on the quantum-confined stark effect (QCSE). Note that the QW electro-absorption modulator may include alternating layers of silicon and silicon-germanium as the active electro-absorption material. When SiGe/Ge QWs are grown on crystal silicon, a silicon-germanium buffer layer typically needs to be grown first to gradually relax the lattice mismatch between the crystal structures of germanium and silicon.

One possible way to fabricate a QCSE QW electro-absorption modulator on a silicon-on-insulator (SOI) substrate with sub-micron optical waveguides is to use a selective growth technique to grow the QCSE structure directly on top of semiconductor layer 110. In particular, using selective epitaxial growth, one can grow the QCSE structure on top of optical waveguide 112, starting with an optional underlayer or buffer 144 (such as silicon-germanium), followed by the SiGe/Ge QWs, and then a cap layer (not shown). Note that the thickness of optional buffer layer 144 and the QWs may be selected such that the center of the QWs is aligned with the optical-mode center of the hybrid optical-waveguide structure (thereby reducing or eliminating optical absorption in optional buffer layer 144).

In another embodiment, epitaxial $Ge_{1-x}Si_x$ is used as active electro-absorption material in optical modulator 114 using the Franz-Keldysh (FK) effect. Instead of growing SiGe/Ge QWs, $Ge_{1-x}Si_x$ material may be grown between the two cap layers. Once again, 3-D taper structures 124 may be used to optically couple the light in and out of the region with the active $Ge_{1-x}Si_x$ material in optical modulator 114 with low optical-coupling loss. For example, bulk germanium may be used. This grows directly onto silicon, and has a high index of refraction, but has weaker electro-absorption modulation than the QCSE QWs. Better contrast or extinction (i.e., a better on/off modulation ratio) can be obtained by increasing length 136 of optical modulator 114, but the average power may be decreased. Alternatively or additionally, an optional optical-gain stage (not shown), which is proximate to either or both of ends 116, may be used in integrated circuit 100.

In exemplary embodiments, length 136 of a germanium electro-absorption modulator is 50 µm, and length 136 of a QW electro-absorption modulator is 25 µm. Furthermore, there may be 30-60 periods of alternating SiGe/Ge layers in the QW electro-absorption modulator. For example, there may be 20 periods. Note that the multiple QW active structure may have a germanium-layer thickness of 135 Å as the QW layer, and a $Ge_{20}Si_{80}$-layer thickness of 65 Å as the barrier layer.

Moreover, the multiple QW active structure may be fabricated as follows. Starting with semiconductor layer 110, a 0.25-µm thick $Ge_{90}Si_{10}$ layer with p-type doping ($1e18\ cm^{-3}$) using boron may be fabricated. Then, the multiple QWs may be fabricated with a total thickness of 0.4 µm and no doping. Next, a 0.4-µm thick $Ge_{90}Si_{10}$ layer with n-type doping ($1e18\ cm^{-3}$) using phosphorous and/or arsenic may be fabricated.

Note that the p-type germanium-silicon layer (i.e., optional buffer layer 144) may provide a thin buffer layer to relax strain and to generate a new lattice constant for the layers in the multiple QWs. Moreover, the p-type germanium-silicon layer may provide a contact window to facilitate application of an electric field normal to the plane of the multiple QWs. The thickness of this layer may be selected to enhance the amplitude of the optical field associated with the optical mode in the multiple QW layers so that the amplitude in optional buffer layer 144 and in the top-contact or cap layer is reduced. This n-type cap layer can provide the contact window to initiate electric-field lines of force that are closed by the bottom p-type contact window (i.e., optional buffer layer 144). Furthermore, the silicon-alloy content in the contact windows may be chosen or selected to minimize the lattice mismatch between the layers in the multiple QWs and the lattice constant of optional buffer layer 144. Thus, the new lattice constant may be uniform in the active-layer design, and may be set to the relaxed lattice constant of optional buffer layer 144.

Figure 3:
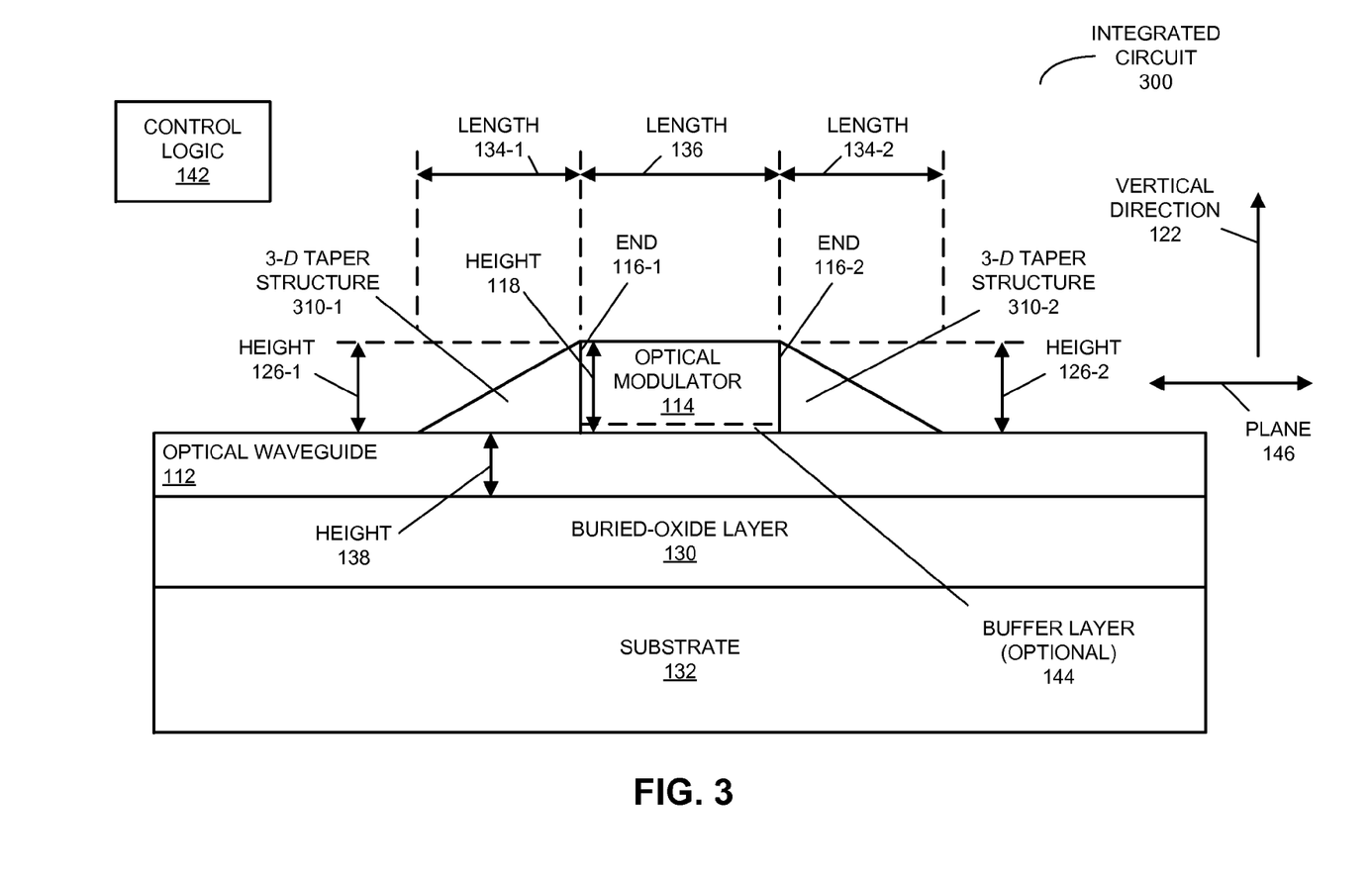
FIG. 3 is a block diagram illustrating a side view of an integrated circuit in accordance with an embodiment of the present disclosure.

While FIGS. 1 and 2 illustrate the taper of the given 3-D taper structure in a plane 146 of optical waveguide 112, in other embodiments the taper is, separately or additionally, in a plane perpendicular to plane 146 (i.e., parallel to vertical direction 122). (Thus, the taper may be in one plane or two planes.) This is shown in FIG. 3, which presents a block diagram illustrating a side view of an integrated circuit 300. (Note that the top view of integrated circuit 300 is the same as that shown in FIG. 2.) In particular, grey-scale etching of 3-D taper structures 310 in integrated circuit 300 may result in the taper being in both planes. This taper may be the same in both planes or may be different.

Furthermore, note that 3-D taper structures in these or the preceding embodiments may be fabricated before optical modulator 114, with optical modulator 114, or after optical modulator 114. For example, after QCSE QWs are fabricated, single-crystal or poly-silicon 3-D taper structures can be grown and shaped on top of optical waveguide 112. Alternatively, in some embodiments 3-D taper structures are included in optical modulator 114.

Figure 4:
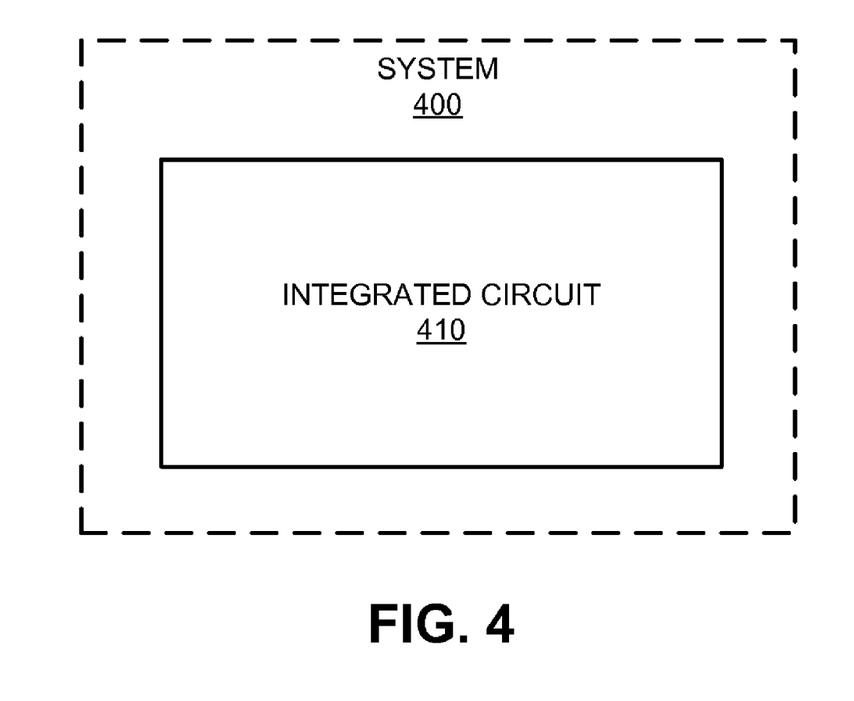
FIG. 4 is a block diagram illustrating a system that includes one of the integrated circuits of FIGS. 1-3 in accordance with an embodiment of the present disclosure.

Integrated circuits 100 (FIGS. 1 and 2) and 300 may be used in a variety of applications. This is shown in FIG. 4, which presents a block diagram illustrating a system 400 that includes an integrated circuit 410. System 400 may includes: a VLSI circuit, a switch, a hub, a bridge, a router, a communication system, a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a portable-computing device, a supercomputer, a network-attached-storage (NAS) system, a storage-area-network (SAN) system, and/or another electronic computing device. Note that a given computer system may be at one location or may be distributed over multiple, geographically dispersed locations.

Integrated circuits 100 (FIGS. 1 and 2) and 300 (FIG. 3), as well as system 400, may include fewer components or additional components. Although these embodiments are illustrated as having a number of discrete items, these integrated circuits and the system are intended to be functional descriptions of the various features that may be present rather than structural schematics of the embodiments described herein. Consequently, in these embodiments two or more components may be combined into a single component, and/or a position of one or more components may be changed. In addition, functionality in the preceding embodiments of the integrated circuits and the system may be implemented more in hardware and less in software, or less in hardware and more in software, as is known in the art. For example, functionality may be implemented in one or more application-specific integrated circuits (ASICs) and/or one or more digital signal processors (DSPs).

While the preceding embodiments have been illustrated with particular elements and compounds, a wide variety of materials and compositions (including stoichiometric and non-stoichiometric compositions) may be used, as is known to one of skill in the art. Furthermore, these materials and compounds may be fabricated using a wide variety of processing techniques, including: evaporation, sputtering, molecular-beam epitaxy, wet or dry etching (such as photolithography or direct-write lithography), polishing, etc.

Figure 5:
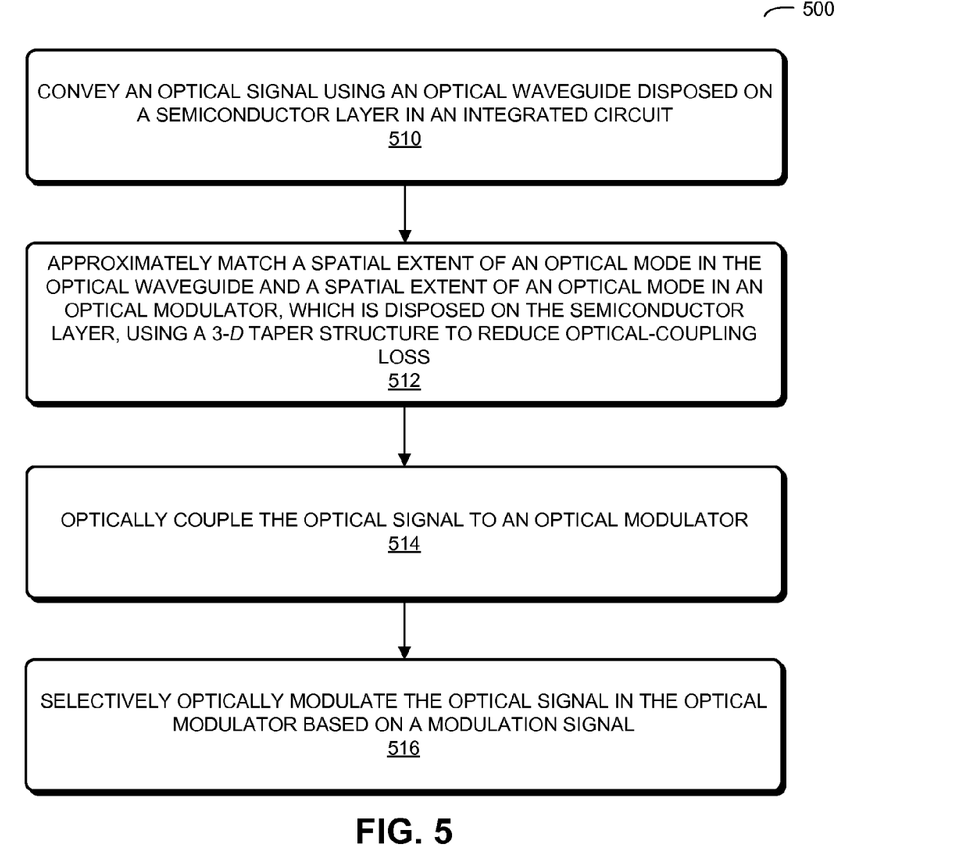
FIG. 5 is a flow chart illustrating a process for selectively optically modulating an optical signal in one of the integrated circuits of FIGS. 1-3 in accordance with an embodiment of the present disclosure.

We now describe embodiments of a process. FIG. 5 presents a flow chart illustrating a process 500 for selectively optically modulating an optical signal in an embodiment of integrated circuit 100 (FIGS. 1 and 2) or 300 (FIG. 3). During the method, the optical signal is conveyed in an optical waveguide disposed in a semiconductor layer in the integrated circuit (operation 510). Then, a spatial extent of an optical mode in the optical waveguide and a spatial extent of an optical mode in an optical modulator, which is disposed on the semiconductor layer, are approximately matched using a 3-D taper structure to reduce optical-coupling loss (operation 512). Note that the 3-D taper structure is disposed on the optical waveguide and is proximate to an end of the optical modulator. In addition, the 3-D taper structure has a height proximate to the optical modulator that approximately equals a height of the optical modulator, and a cross-sectional area of the 3-D taper structure increases from a first value distal to the end to a second value proximate to the end, which approximately equals the cross-sectional area of the optical modulator. Next, the optical signal is optically coupled to the optical modulator (operation 514). Furthermore, the optical signal in the optical modulator is selectively optically modulated based on a modulation signal (operation 516), such as an electrical signal.

In some embodiments of process 500, there are additional or fewer operations. Moreover, the order of the operations may be changed, and/or two or more operations may be combined into a single operation.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An integrated circuit, comprising:
   an optical waveguide defined in a semiconductor layer;
   an optical modulator, having a first end and a second end, disposed on the optical waveguide, wherein a given end, which can be one of the first end and the second end, has a cross-sectional area having a first value; and
   a first 3-dimensional (3-D) taper structure and a second 3-D taper structure that are, respectively, proximate to the first end and the second end, wherein at least one of the first and the second 3-D taper structure is disposed directly on the optical waveguide, wherein a height of the first 3-D taper structure and a height of the second 3-D taper structure proximate to the optical modulator approximately equal a height of the optical modulator, and wherein a cross-sectional area of a given 3-D taper structure, which can be one of the first 3-D taper structure and the second 3-D taper structure, increases from a second value distal to the given end to the first value proximate to the given end, thereby reducing optical-coupling loss by approximately matching a spatial extent of an optical mode in the optical waveguide and a spatial extent of an optical mode in the optical modulator.

2. The integrated circuit of claim 1, wherein the semiconductor layer includes silicon.

3. The integrated circuit of claim 1, wherein the taper of the given 3-D taper structure is in a plane of the optical waveguide.

4. The integrated circuit of claim 1, wherein the taper of the given 3-D taper structure is in a plane of the optical waveguide and perpendicular to the plane.

5. The integrated circuit of claim 1, further comprising:
   a substrate; and
   a buried-oxide layer disposed on the substrate, wherein the semiconductor layer is disposed on the buried-oxide layer.

6. The integrated circuit of claim 5, wherein the substrate includes a semiconductor.

7. The integrated circuit of claim 5, wherein the substrate, the buried-oxide layer and the semiconductor layer comprise a silicon-on-insulator technology.

8. The integrated circuit of claim 1, wherein the optical modulator includes an electro-optic modulator.

9. The integrated circuit of claim 1, wherein the optical modulator includes an electro-absorption modulator.

10. The integrated circuit of claim 1, wherein the first 3-D taper structure and the second 3-D taper structure are included in the optical modulator.

11. A system, comprising an integrated circuit, wherein the integrated circuit includes:
    an optical waveguide defined in a semiconductor layer;
    an optical modulator, having a first end and a second end, disposed on the optical waveguide, wherein a given end, which can be one of the first end and the second end, has a cross-sectional area having a first value; and
    a first 3-dimensional (3-D) taper structure and a second 3-D taper structure that are, respectively, proximate to the first end and the second end, wherein at least one of the first and the second 3-D taper structure is disposed directly on the optical waveguide, wherein a height of the first 3-D taper structure and a height of the second 3-D taper structure proximate to the optical modulator approximately equal a height of the optical modulator, and wherein a cross-sectional area of a given 3-D taper structure, which can be one of the first 3-D taper structure and the second 3-D taper structure, increases from a second value distal to the given end to the first value proximate to the given end, thereby reducing optical-coupling loss by approximately matching a spatial extent of an optical mode in the optical waveguide and a spatial extent of an optical mode in the optical modulator.

12. The system of claim 11, wherein the semiconductor layer includes silicon.

13. The system of claim 11, wherein the taper of the given 3-D taper structure is in a plane of the optical waveguide.

14. The system of claim 11, wherein the taper of the given 3-D taper structure is in a plane of the optical waveguide and perpendicular to the plane.

15. The system of claim 11, wherein the integrated circuit further comprises:
a substrate; and
a buried-oxide layer disposed on the substrate, wherein the semiconductor layer is disposed on the buried-oxide layer.

16. The system of claim 15, wherein the substrate includes a semiconductor.

17. The system of claim 15, wherein the substrate, the buried-oxide layer and the semiconductor layer comprise a silicon-on-insulator technology.

18. The system of claim 11, wherein the first 3-D taper structure and the second 3-D taper structure are included in the optical modulator.

19. A method for selectively optically modulating an optical signal in an integrated circuit, comprising:
conveying the optical signal in an optical waveguide disposed in a semiconductor layer in the integrated circuit;
approximately matching a spatial extent of an optical mode in the optical waveguide and a spatial extent of an optical mode in an optical modulator, which is disposed on the semiconductor layer, using a 3-D taper structure to reduce optical-coupling loss, wherein the 3-D taper structure is disposed directly on the optical waveguide and is proximate to an end of the optical modulator, wherein the 3-D taper structure has a height proximate to the optical modulator that approximately equals a height of the optical modulator, and wherein a cross-sectional area of the 3-D taper structure increases from a first value distal to the end to a second value proximate to the end, which approximately equals a cross-sectional area of the optical modulator;
optically coupling the optical signal to the optical modulator; and
selectively optically modulating the optical signal in the optical modulator based on an modulation signal.

20. The integrated circuit of claim 1, wherein the at least one of the first and the second 3-D taper structure that is disposed directly on the optical waveguide is disposed directly on a top surface of the optical waveguide without other layers in-between.

* * * * *